United States Patent
Virtej et al.

(10) Patent No.: US 12,035,392 B2
(45) Date of Patent: Jul. 9, 2024

(54) MULTI-CARRIER COMMUNICATION

(71) Applicant: NOKIA TECHNOLOGIES OY, Espoo (FI)

(72) Inventors: Elena Virtej, Espoo (FI); Tero Henttonen, Espoo (FI); Jarkko Tuomo Koskela, Oulu (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 357 days.

(21) Appl. No.: 17/432,752

(22) PCT Filed: Feb. 25, 2019

(86) PCT No.: PCT/EP2019/054565
§ 371 (c)(1),
(2) Date: Aug. 20, 2021

(87) PCT Pub. No.: WO2020/173538
PCT Pub. Date: Sep. 3, 2020

(65) Prior Publication Data
US 2022/0124853 A1 Apr. 21, 2022

(51) Int. Cl.
*H04W 76/15* (2018.01)
*H04L 5/00* (2006.01)
*H04W 72/542* (2023.01)

(52) U.S. Cl.
CPC ............. *H04W 76/15* (2018.02); *H04L 5/001* (2013.01); *H04L 5/0098* (2013.01); *H04W 72/542* (2023.01)

(58) Field of Classification Search
CPC .... H04W 76/15; H04W 72/542; H04L 5/001; H04L 5/0098
(Continued)

(56) References Cited

U.S. PATENT DOCUMENTS

2012/0302245 A1\* 11/2012 Huang .............. H04W 36/0027
455/438
2016/0262065 A1 9/2016 Axmon et al.
(Continued)

FOREIGN PATENT DOCUMENTS

EP 2 696 624 A1 2/2014

OTHER PUBLICATIONS

International Search Report and Written Opinion dated Oct. 29, 2019 corresponding to International Patent Application No. PCT/EP2019/054565.
(Continued)

*Primary Examiner* — Obaidul Huq
(74) *Attorney, Agent, or Firm* — Lippes Mathias LLP

(57) ABSTRACT

According to an example aspect of the present invention, there is provided apparatus comprising at least one processing core, at least one memory including computer program code, the at least one memory and the computer program code being configured to, with the at least one processing core, cause the apparatus at least to receive, from a primary cell, a candidate secondary cell configuration which comprises at least one condition, determine that the at least one condition is fulfilled, and activate, as a response to the determining, the candidate secondary cell into a carrier aggregation or a dual connectivity session of the apparatus.

11 Claims, 6 Drawing Sheets

(58) Field of Classification Search
USPC .......................................... 370/310, 328, 329
See application file for complete search history.

(56) References Cited

U.S. PATENT DOCUMENTS

| | | | |
|---|---|---|---|
| 2019/0208436 A1* | 7/2019 | Zhou | H04L 1/0026 |
| 2019/0253941 A1* | 8/2019 | Cirik | H04W 36/0077 |
| 2020/0275485 A1* | 8/2020 | Babaei | H04W 74/0808 |

OTHER PUBLICATIONS

Communication pursuant to Article 94(3) EPC dated Sep. 21, 2023, corresponding to European Patent Application No. 19707365.3.

* cited by examiner

MULTI-CARRIER COMMUNICATION

FIELD

The present disclosure relates to wireless communication, such as wireless communication in a cellular communication system.

BACKGROUND

Wireless communication may take place over a single carrier connecting a base station or access point to a mobile station, or over plural carriers connecting the mobile station to one or more base station and/or access point. Where plural carriers are used, benefits may be obtained in increased communication capacity and resilience against fading, for example.

Where plural carriers connect the mobile station to one base station, the multi-carrier communication is referred to as carrier aggregation. On the other hand, where plural carriers connect the mobile station to more than one base station, the multi-carrier communication is referred to as dual connectivity.

SUMMARY

According to some aspects, there is provided the subject-matter of the independent claims. Some embodiments are defined in the dependent claims.

According to a first aspect of the present disclosure, there is provided an apparatus comprising at least one processing core, at least one memory including computer program code, the at least one memory and the computer program code being configured to, with the at least one processing core, cause the apparatus at least to receive, from a primary cell, a candidate secondary cell configuration which comprises at least one condition, determine that the at least one condition is fulfilled, and activate, as a response to the determining, the candidate secondary cell into a carrier aggregation or a dual connectivity session of the apparatus.

According to a second aspect of the present disclosure, there is provided a method comprising receiving, in an apparatus, from a primary cell, a candidate secondary cell configuration which comprises at least one condition, determining that the at least one condition is fulfilled, and activating, as a response to the determining, the candidate secondary cell into a carrier aggregation or a dual connectivity session of the apparatus.

According to a third aspect of the present disclosure, there is provided an apparatus comprising at least one processing core, at least one memory including computer program code, the at least one memory and the computer program code being configured to, with the at least one processing core, cause the apparatus at least to provide, to a user equipment, from a primary cell, for a carrier aggregation or dual connectivity session, a candidate secondary cell configuration which comprises at least one condition, and signal to the candidate secondary cell to reserve, for the user equipment, resources in the candidate secondary cell which correspond to the candidate secondary cell configuration.

According to a fourth aspect of the present disclosure, there is provided a method, comprising providing, to a user equipment, from a primary cell, a candidate secondary cell configuration which comprises at least one condition, and signalling to the candidate secondary cell to reserve, for the user equipment, resources in the candidate secondary cell which correspond to the candidate secondary cell configuration.

According to a fifth aspect of the present disclosure, there is provided an apparatus comprising means for receiving, from a primary cell, a candidate secondary cell configuration which comprises at least one condition, means for determining that the at least one condition is fulfilled, and means for activating, as a response to the determining, the candidate secondary cell into a carrier aggregation or a dual connectivity session of the apparatus.

According to a sixth aspect of the present disclosure, there is provided an apparatus comprising means for providing, to a user equipment, from a primary cell, a candidate secondary cell configuration which comprises at least one condition, and means for signalling to the candidate secondary cell to reserve, for the user equipment, resources in the candidate secondary cell which correspond to the candidate secondary cell configuration.

According to a seventh aspect of the present disclosure, there is provided a non-transitory computer readable medium having stored thereon a set of computer readable instructions that, when executed by at least one processor, cause an apparatus to at least receive, from a primary cell, a candidate secondary cell configuration which comprises at least one condition, determine that the at least one condition is fulfilled, and activate, as a response to the determining, the candidate secondary cell into a carrier aggregation or a dual connectivity session of the apparatus.

According to an eighth aspect of the present disclosure, there is provided a non-transitory computer readable medium having stored thereon a set of computer readable instructions that, when executed by at least one processor, cause an apparatus to at least provide, to a user equipment, from a primary cell, a candidate secondary cell configuration which comprises at least one condition, and signal to the candidate secondary cell to reserve, for the user equipment, resources in the candidate secondary cell which correspond to the candidate secondary cell configuration.

According to a ninth aspect of the present disclosure, there is provided a computer program configured to cause a method at least the following to be performed, when run on a computer receiving, from a primary cell, a candidate secondary cell configuration which comprises at least one condition, determining that the at least one condition is fulfilled, and activating, as a response to the determining, the candidate secondary cell into a carrier aggregation or a dual connectivity session of the apparatus.

According to a tenth aspect of the present disclosure, there is provided a computer program configured to cause a method at least the following to be performed, when run on a computer: providing, to a user equipment, from a primary cell, a candidate secondary cell configuration which comprises at least one condition, and signalling to the candidate secondary cell to reserve, for the user equipment, resources in the candidate secondary cell which correspond to the candidate secondary cell configuration.

EMBODIMENTS

By using a conditional secondary-cell configuration, a setup delay, e.g. for inter-frequency secondary cells, may be reduced for carrier aggregation or dual connectivity session set-up. The condition may relate to a measurement condition or event trigger, for example, such that a user equipment having the conditional secondary-cell configuration may activate the secondary cell autonomously as a response to the condition being fulfilled. Thus setup delay may be reduced as a separate secondary cell configuration is not needed as a response to measurement reporting from the user equipment.

Figure 1:
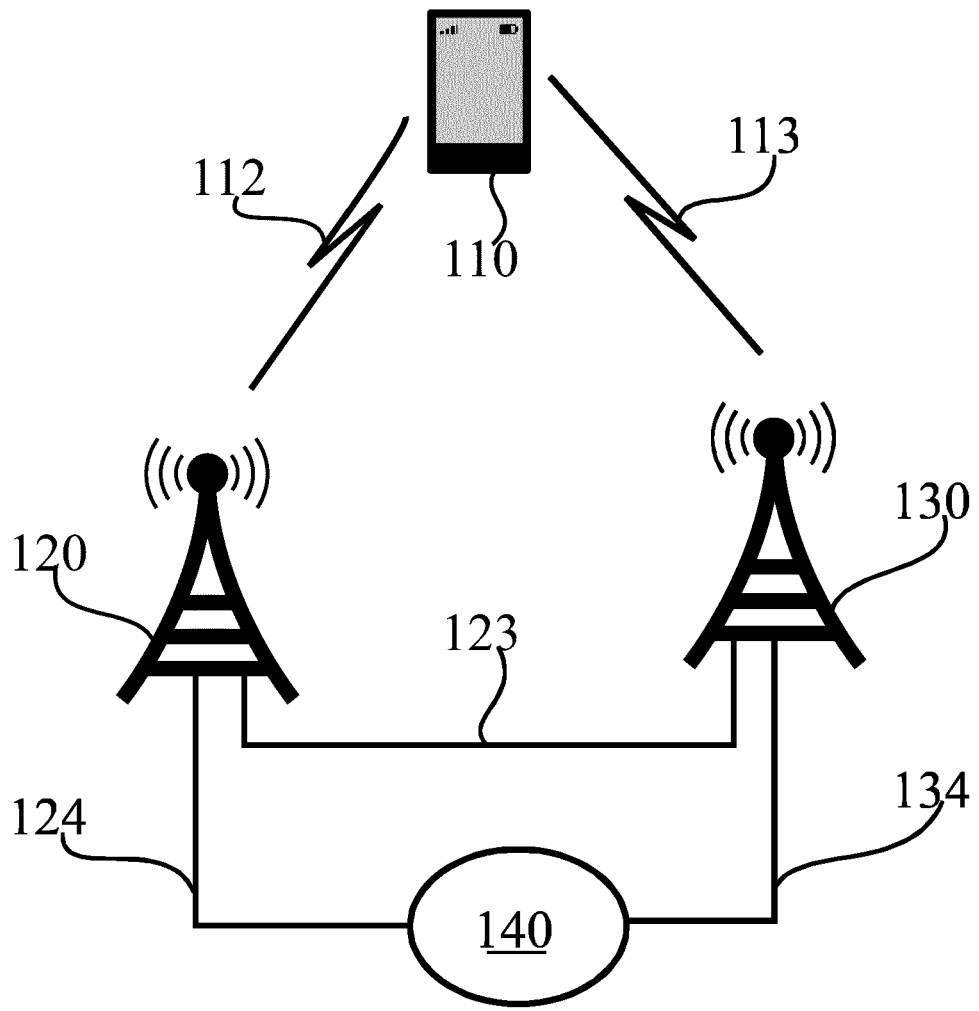
FIG. 1 illustrates an example system in accordance with at least some example embodiments of the present invention.

FIG. 1 illustrates an example system in accordance with at least some example embodiments of the present invention. The illustrated system comprises user equipment, UE, 110. UE 110 may comprise a smartphone, feature phone, a tablet or laptop computer, an another kind of computer, a machine-to-machine or Internet of Things node, for example. UE 110 is enabled to communicate simultaneously with cells controlled by base stations 120 and 130. The base stations may be configured to operate in accordance with a cellular standard, such as, for example, fifth generation, 5G, also known as new radio, NR, or wideband code division multiple access, WCDMA.

Information transmitted by UE 110 toward a base station is referred to as uplink communication, while information transmitted by base stations toward UE 110 is referred to as downlink communication. A carrier may comprise both uplink and downlink communication.

In the illustrated example scenario, UE 110 has carrier 112 with base station 120 and carrier 113 with base station 130. By saying UE has a carrier with a base station, it is meant that the UE has a carrier with a cell controlled by this base station. As the illustrated example scenario has plural carriers with plural base stations, it is a dual connectivity session. Base station 120 controls a primary cell, PCell, and base station 130 controls a secondary cell, SCell. In another example, base station 120 controls an MCG (master cell group), having a PCell and one or multiple SCells, while base station 130 controls an SCG (secondary cell group), having a PSCell and one or multiple SCells. In one example, a mobility anchor cell could be an LTE cell, while the user data may go through a 5G cell. Of course, this is just an example, as there are many forms of dual connectivity/multi-connectivity (e.g. E-UTRA NR dual connectivity, EN-DC, NR-NR DC, or more general term of multi-radio access technology dual connectivity, MR-DC, etc.). UE 110 may have, in a multi-carrier session, more than one carrier to a single base station or cell controlled by a single base station. The communicative capacities of the carriers may be added together to form the communicative capacity of the multi-carrier session. Where the same information is transmitted to a UE from more than one cell, the situation may be referred to as soft handover or softer handover, which is thus a different concept.

An inter-base station connection 123 enables base stations 120 and 130 to exchange information with each other directly. Examples of inter-base station connections include Xn and X2 connections, depending on the specific technology used in the base stations. An inter-base station connection is useful in coordinating handovers between the base stations, for example. Further, base stations 120 and 130 are comprised in an overall cellular communication system which comprises a core network 140 in addition to a radio access network, RAN, where the base stations are comprised. Nodes in the core network 140 may be tasked with network-wide functions such as subscriber registers, switching, billing and mobility management, for example. Base stations 120 and 130 are enabled to communicate with core network 140 via connections 124 and 134, respectively.

Modifying a single-carrier session by adding a carrier to a SCell is referred to as carrier aggregation/dual connectivity, CA/DC, set-up or simply SCell addition. Where communication capacity of plural carriers is needed, it is useful to obtain this capacity as soon as feasible, and therefore a technical benefit is obtained by minimizing the set-up delay of adding an SCell.

Reducing setup delays in general may be attempted by, for example, conditional channel quality indicator, CQI, reporting periodicity as well as idle-mode measurements, which may have conditional components for when the UE is triggered to perform the measurements. According to present 5G specifications, CA/DC set-up specifies how SCells are setup, in a deactivated state. In this process, dual connectivity setup requires the UE to perform a random access procedure with a primary secondary cell, PSCell. A PScell is the primary one from among SCells, where more than one SCell participates in a multi-carrier session in addition to the PCell. Further, SCells are normally deactivated at configuration, and there is in current specifications no autonomous UE actions for SCells until the network explicitly activates them.

In the present specifications, SCell addition is based on a measurement report received from the UE, to which the network reacts by providing the SCell configuration to the UE and activating the SCell. In case a previous multi-carrier session used a SCell, the configuration information relating to that cell may be kept by the UE when the UE is in an inactive state. However, the old configuration information may be irrelevant when later employed, for example if the UE moves while it is in the inactive state. Blind configuration of SCells is possible, however, it is not resource efficient In this case of blind configuration, the network may configure a cell that has not been detected and reported by the UE. Therefore, this procedure takes time as the UE needs to detect the cells and measure them still, and has higher risk of failing since the UE is not in the range of the configured cell.

It is herein proposed that the setup delay is reduced by using a candidate SCell configuration which comprises at least one condition. The condition is associated with the SCell configuration in the sense that the condition applies to the SCell configuration, the condition need not be physically comprised in a same data structure with the SCell configuration. The candidate SCell configuration comprises configuration information, which may comprise radio resource configuration information of the candidate secondary cell. Such radio resource configuration information may in turn comprise scheduling information informing the UE of radio resources it may use in communicating with the candidate SCell. Alternatively to, or in addition to, scheduling information, the radio resource configuration information may comprise other information usable in activating the SCell from the UE without network involvement. This could comprise, for example, information needed by the UE to find, identify and access the cell, such as for example one or more of the cell ID, carrier frequency and bandwidth, reference signal configuration, channel configuration, and/or other system information. The candidate SCell configuration information may also comprise, or be associated with, a validity time after which the configuration information is no longer valid. The validity time may be, for example, one second, two seconds, one minute or two minutes. For example, the validity time could work so, that in case the configuration does not become active (condition not fulfilled) within the time window after connection setup, the UE may drop it (for example, there could be a specific new timer for this—e.g. 1 or 2 seconds). This way, this autonomous SCell addition can happen only at the beginning of connection and not unexpectedly (to NW) later. In another example there could alternatively or in addition be another timer for how long the configuration is valid from when given—e.g. 2 minutes. This second timer would restrict for how long the configuration is valid. If new connection is established later than this, the UE does not check for the condition for autonomously adding an SCell.

In one example, the network pre-configures the UE with candidate SCell configuration(s) associated with a condition, for example a measurement condition with an event trigger condition(s). The condition could apply to a single candidate SCell or a list of candidate SCells. In case the condition (e.g. measurement event trigger condition, which could also include e.g. a time-to-trigger and hysteresis just as with any measurement events) is fulfilled, the UE applies the conditional configuration.

To indicate that new SCell was added, the UE may start reporting CQI of the added SCell, which allows the network to know the configuration was activated. In another example, RRC signaling may be used to indicate the network that UE activated the configuration, e.g. a measurement report. In another example, this could be any explicit signaling from UE to network for example MAC CE For a small number of candidate SCells, the CQI reporting approach is feasible (and faster), but for larger number of candidate cells, the explicit signaling (e.g. via RRC or MAC) could be preferred as it is more reliable and causes less overhead (no need to reserve UL resources for CQI reporting or consider priority rules for CQI)

As a result, the SCell is configured faster, because of avoided signaling steps (measurement reporting+SCell configuration, SCell activation and activation delay). This method could be applied in connected mode but could also be applied together with for example retained CA/DC configurations when moving from INACTIVE/IDLE to CONNECTED.

The primary cell may provide the conditional SCell configuration to the UE by dedicated signalling or broadcast signalling. When broadcast signalling is used, system information signalling may be used. For example, system information block SIBx (for example, if x=5, it would be System Information Block Type 5 (SIB5)) may be used to deliver the conditional SCell configuration to the UE. This conditional configuration could be part of the CONNECTED mode configuration, with the SCell configuration activated immediately when the condition is fulfilled. As the UE may maintain RRC configurations in RRC INACTIVE state, this configuration would be immediately usable when resuming a connection and the SCell could be activated as fast as possible at/after connection resumption. Alternatively, this configuration could be signalled when moving the UE to RRC INACTIVE/IDLE state. In this case, when the conditional SCell configuration could be given in connection with a release of a connection, the UE may apply it already before connection setup/resume is completed, for example at paging or at traffic arrival. This would allow conditional configuration also quickly from RRC IDLE state where the configuration is not normally kept.

A primary cell may provide the UE more than one candidate SCell configuration which comprises at least one condition, the configurations relating to different SCells. In connection with establishing the candidate SCell configuration which comprises at least one condition, the primary cell may communicate with the SCell(s) involved, to obtain the configuration information, which may comprise, as described above, scheduling information, for example. As the PCell communicates with the SCell to establish the configuration information, resources corresponding to the configuration information may be reserved in the SCell pre-emptively for the UE. As resources are reserved in the SCell(s) for a connection which may or may not be taken into use, a resource reservation overhead is generated. The impact of this overhead may be controlled by the validity time discussed above. In case the UE does not activate the configuration it has received before expiry of the validity time, the UE may simply discard the configuration information, as it is no longer useful and the resources in the candidate SCell(s) are no longer reserved for the UE.

The at least one condition may comprise at least one of the following: a received reference signal power of the candidate SCell being higher than a threshold, a received reference signal power of the candidate SCell being higher than a threshold for at least a preconfigured time and a hysteresis parameter. A single condition, or set of conditions, may apply to one candidate SCell or to plural candidate SCells, which may be identified in the configuration information. The condition may also be an event based trigger. An example of measurement condition would be based on existing measurement events, such as: if UE measures RSRP of a candidate SCell, where RSRP>threshold for a time window of X ms (for example TTT=X ms) then the conditional SCell configuration is activated by the UE for the corresponding candidate SCell. After this, UE may indicate to NW that it is ready to receive in the SCell by initiating the CQI reporting. In case the condition is fulfilled by multiple candidate SCells, the UE may pick the strongest of these, or it may be allowed to pick any of the cells fulfilling the condition.

Responsive to determining the condition, or plural conditions, are fulfilled, the UE may apply the candidate SCell configuration. Applying the SCell configuration may comprise activating the candidate SCell into a carrier aggregation or dual connectivity session of the UE. As the UE may already have the scheduling information for the SCell, it may simply start communicating with the SCell, thus compared to present specifications, the phases of measurement reporting to the PCell, followed by separate SCell configuration, and activation delays are avoided. The SCell is already active and waiting for the UE to contact it.

In connection with applying the conditional SCell configuration, the UE may inform the network that the configuration has been taken into use. This may comprise initiating from the UE at least one of: a channel quality indication, CQI, procedure, a measurement report and a medium access control, MAC, control element, CE, to the primary cell to inform the primary cell of the activating of the candidate secondary cell. In detail, the CQI procedure may be used by the UE to report a channel quality of the activated SCell. For a small number of candidate SCells, the CQI reporting approach is feasible and faster, but for larger number of candidate cells, the explicit signaling via RRC or MAC CE may be preferred as it is more reliable and causes less overhead. The RRC/MAC overhead is lower since there is no need to reserve UL resources for CQI reporting or to consider priority rules for CQI.

This conditional SCell configuration procedure may be applied in connected mode, but may also be applied together with retained CA/DC configurations when moving from INACTIVE/IDLE mode to CONNECTED mode. This accelerates multi-carrier session set-up in cases where the reason for the transitioning to connected mode is that high bandwidth is needed, and in these cases the conditional SCell configuration may be taken into use almost at once after it is provided, within a 1- or 2-second validity time, for example.

Figure 2:
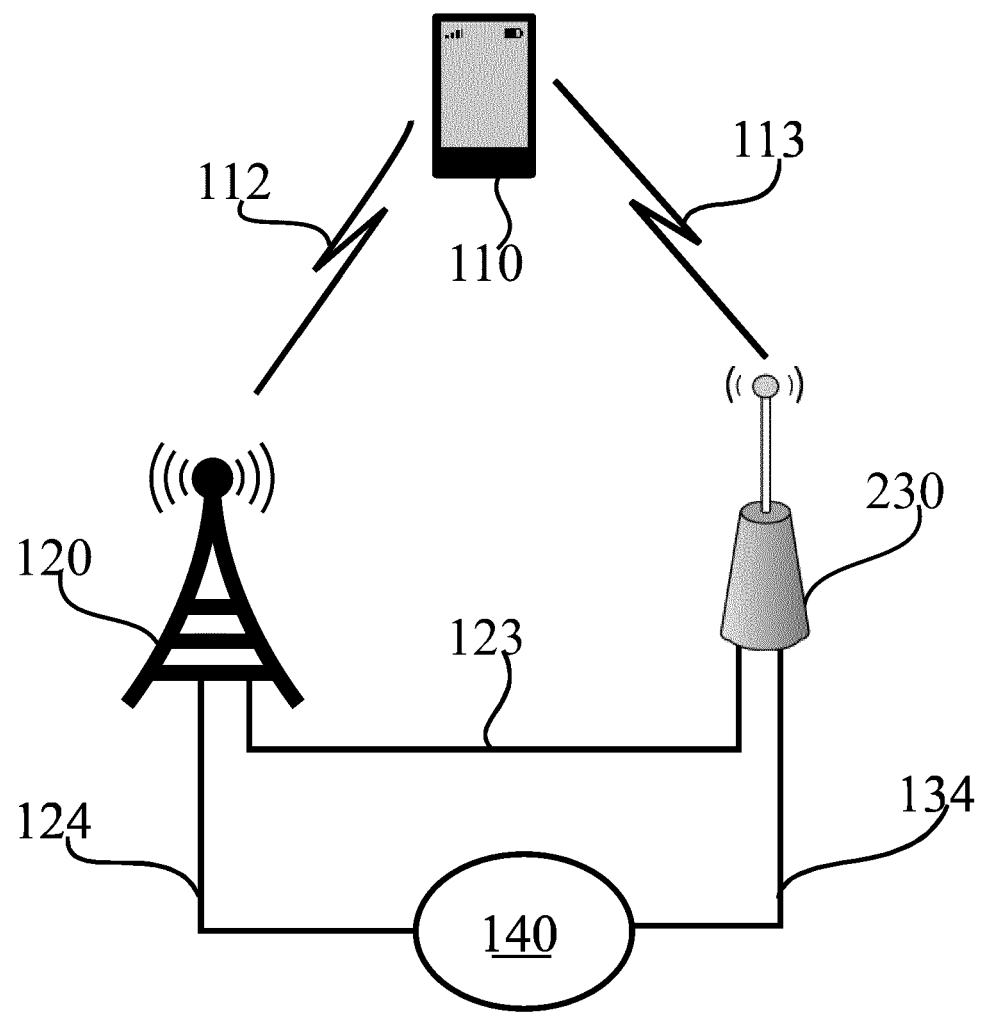
FIG. 2 illustrates an example system in accordance with at least some example embodiments of the present invention.

FIG. 2 illustrates an example system in accordance with at least some example embodiments of the present invention. The system of FIG. 2 is similar to that of FIG. 1, however instead of base station 130, an access point 230 is provided instead. Access point 230 is configured to operate in accordance with a non-cellular technology, such as wireless local area network, WLAN, or worldwide interoperability for microwave access, WiMAX. This illustrates that principles of the disclosed solution may be applied to multi-radio access technology, multi-RAT, multi-carrier sessions as well. In the system of FIG. 2, access point 230 controls a "cell" which may perform as a SCell in a multi-carrier session of UE 110. The PCell may communicate with access point 230 to reserve resources in the "cell" of access point 230, and the PCell may provide conditional SCell configuration information to UE 110 corresponding to the resources reserved in access point 230.

Figure 3:
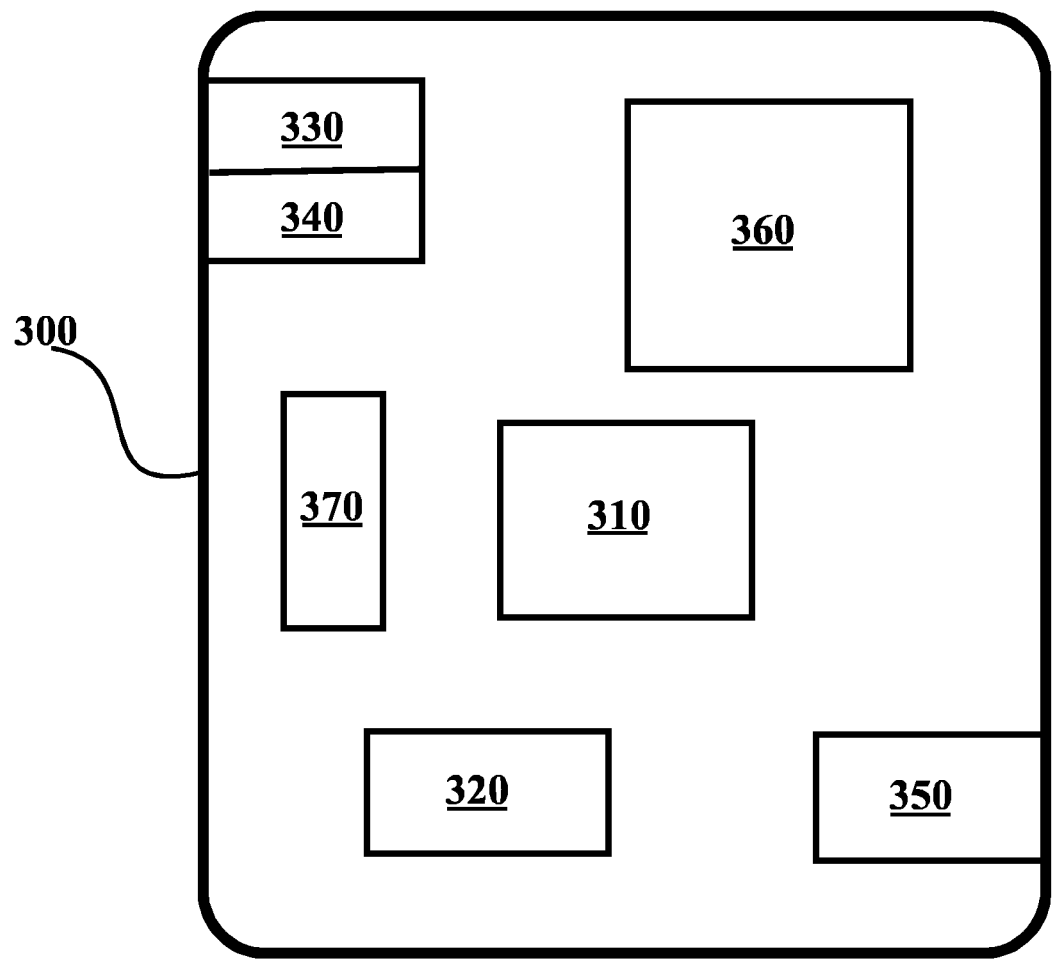
FIG. 3 illustrates an example apparatus capable of supporting at least some example embodiments of the present invention.

FIG. 3 illustrates an example apparatus capable of supporting at least some embodiments of the present invention. Illustrated is device 300, which may comprise, for example, a mobile communication device such as UE 110 of FIG. 1 or FIG. 2. In applicable parts, device 300 may also correspond to structure of a base station. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present disclosure.

Figure 4:
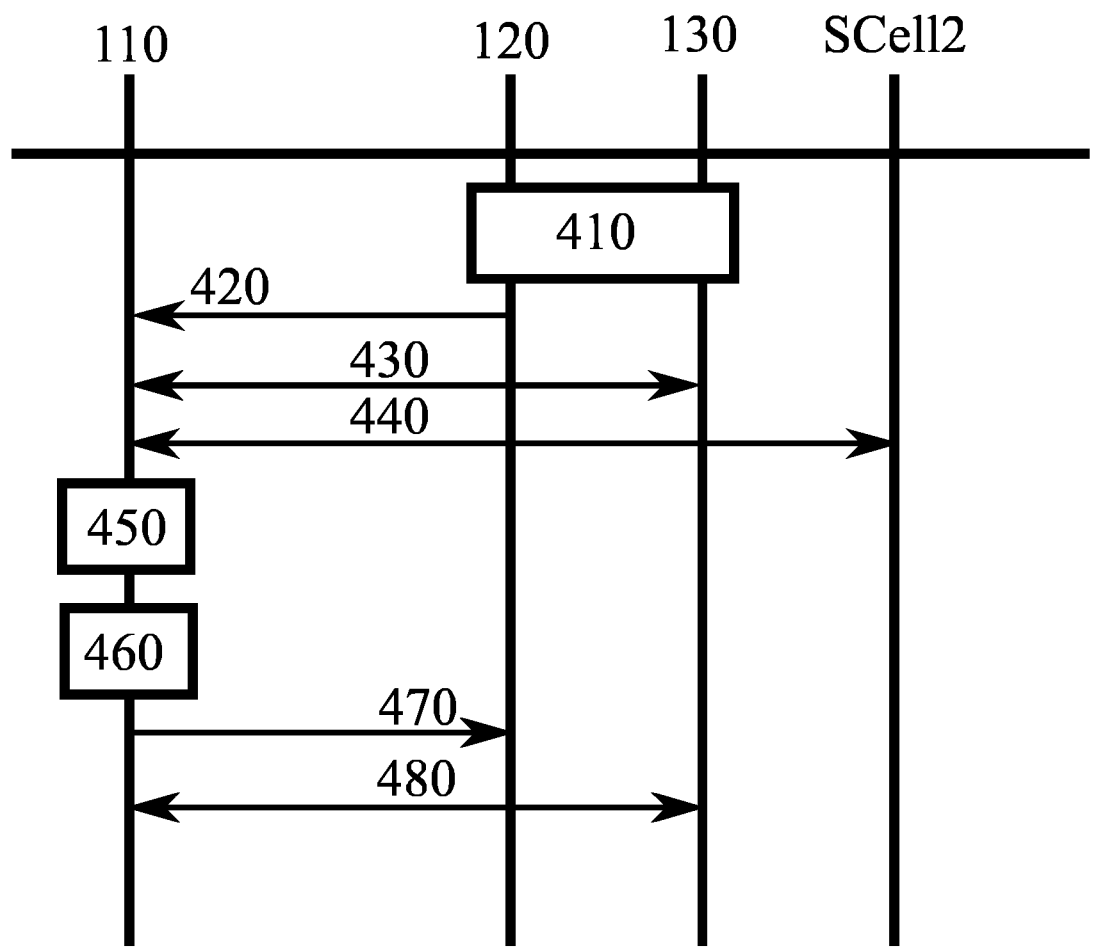
FIG. 4 illustrates signalling in accordance with at least some example embodiments of the present invention.

FIG. 4 illustrates signalling in accordance with at least some embodiments of the present invention. On the vertical axes are disposed, on the left, UE 110 of FIG. 1, Base stations 120 and 130, as well as a further candidate SCell, "SCell2". Time advances from the top toward the bottom.

In phase 410, the PCell and SCell communicate to establish the conditional SCell configuration information and the corresponding resource reservations in the SCell. This may take place over the inter-base station connection, for example. On the other hand, when the SCell addition relates to carrier aggregation, the same base station controls PCell and the SCell, making communication over an inter-base station connection unnecessary as the base station may reserve the resources internally. In phase 420, the conditional SCell configuration(s) is/are provided to the UE, associated with measurement condition(s). Phase 420 may take place during a connected mode of UE 110, or as UE 110 is transitioning to an active state or inactive state, for example. The condition associated with the SCell configuration information may comprise, for example, that reference signal received power, RSRP, >(greater or equal than) threshold for a time period for example time-to-trigger=x seconds for the specific SCell. Once the condition is fulfilled, the conditional SCell configuration is activated by the UE for the corresponding candidate SCell. After this, UE indicates to NW that it is ready to receive in the SCell by initiating the CQI reporting. In an example, other signal quality criteria could be used (for example RSRQ, . . . )

In phases 430 and 440, the UE performs measurements of the SCells to enable determining, whether the condition(s) is/are satisfied. In phase 450, UE 110 determines that the condition(s) is/are satisfied, triggering phase 460, where the conditional SCell configuration is taken into use by UE 110. The network, for example PCell, is informed of this in phase 470, which may comprise a CQI report, for example, as described herein above. The UE is subsequently in a scheduled state with respect to the activated SCell in phase 480. Phase 480 is to be seen as a continuous phase, and not a phase which needs to start only after phase 470. Rather, the UE is scheduled simply since it takes into use the configuration information in phase 460.

In an example, the conditional SCell configuration could be signalled when moving UE to RRC INACTIVE/IDLE. In this case, when the configuration could be given before/at release of connection, UE may apply it already before connection setup/resume is completed (for example at paging or at traffic arrival). This would allow conditional configuration also fastly from RRC IDLE state where the configuration is not normally kept (unlikely in RRC INACTIVE state).

Figure 5:
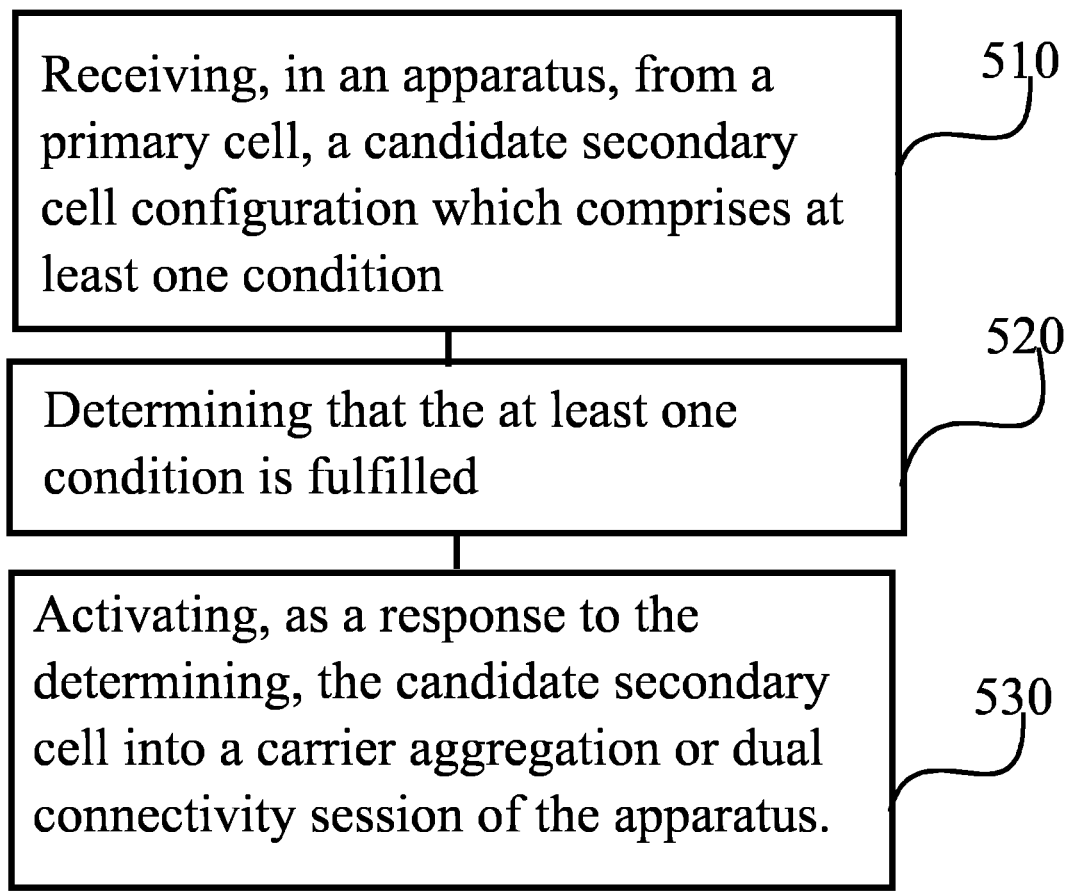
FIG. 5 is a flow graph of a method in accordance with at least some example embodiments of the present invention.

FIG. 5 is a flow graph of a method in accordance with at least some embodiments of the present invention. The phases of the illustrated method may be performed in device 110, or in a control device configured to control the functioning thereof, when installed therein.

Phase 510 comprises receiving, from a primary cell, a candidate secondary cell configuration which comprises at least one condition. Phase 520 comprises determining that the at least one condition is fulfilled. Finally, phase 530 comprises activating, as a response to the determining, the candidate secondary cell into a carrier aggregation or a dual connectivity session of the apparatus.

Figure 6:
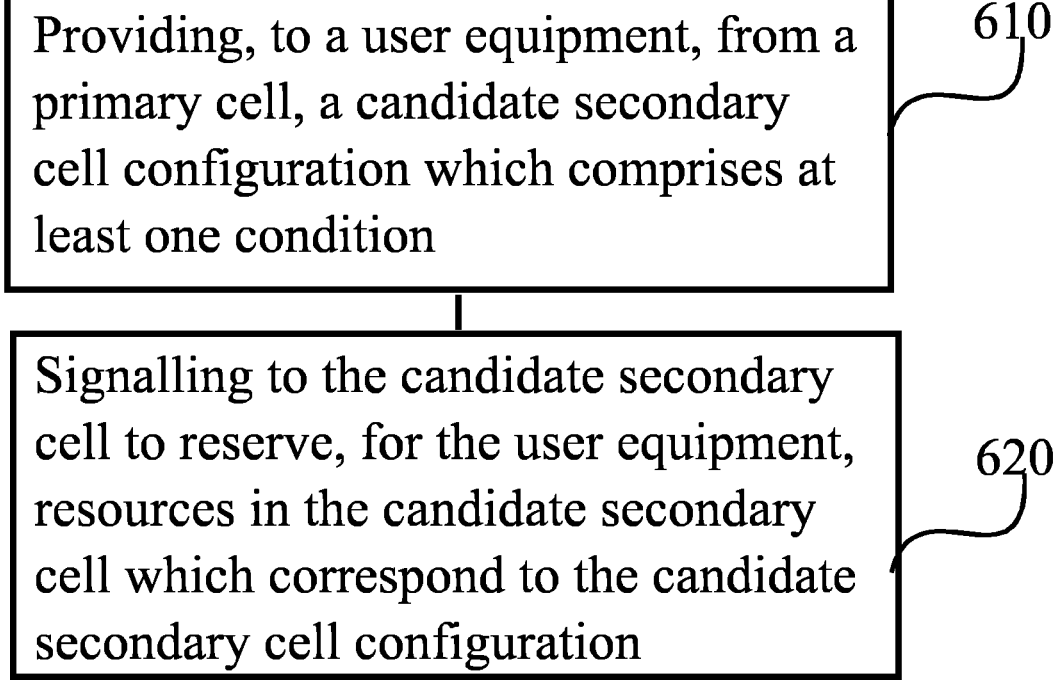
FIG. 6 is a flow graph of a method in accordance with at least some example embodiments of the present invention.

FIG. 6 is a flow graph of a method in accordance with at least some embodiments of the present invention. The phases of the illustrated method may be performed in base station 120, or in a control device configured to control the functioning thereof, when installed therein.

Phase 610 comprises providing, to a user equipment, from a primary cell, a candidate secondary cell configuration which comprises at least one condition. Phase 620 comprises signalling to the candidate secondary cell to reserve, for the user equipment, resources in the candidate secondary cell which correspond to the candidate secondary cell configuration. Phase 620 may precede phase 610.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication in wireless networks.

REFERENCE SIGNS LIST

| 110 | User equipment, UE |
| 120, 130 | Base station |
| 140 | Core network |
| 112, 113 | Carriers |
| 123 | Inter-base station connection |

-continued

REFERENCE SIGNS LIST

| 124, 134 | Connection |
| 230 | Access Point |
| 300-370 | Structure of the device of FIG. 3 |
| 410-480 | Phases of the method of FIG. 4 |
| 510-530 | Phases of the method of FIG. 5 |
| 610-620 | Phases of the method of FIG. 6 |

The invention claimed is:

1. An apparatus, comprising:
   at least one processing core;
   at least one memory including computer program code, the at least one memory and the computer program code being configured to, with the at least one processing core, cause the apparatus at least to:
   receive, from a primary cell, a candidate secondary cell configuration which comprises conditions, wherein the candidate secondary cell configuration comprises radio resource configuration information of the candidate secondary cell;
   determine that the conditions are fulfilled, and
   activate, as a response to the determining, the candidate secondary cell into a carrier aggregation or a dual connectivity session of the apparatus,
   wherein the apparatus is configured to initiate: a channel quality indication procedure, a measurement report, and a medium access control element to the primary cell to inform the primary cell of the activating of the candidate secondary cell,
   wherein the conditions comprise: a received reference signal power of the candidate secondary cell being higher than a threshold for at least a preconfigured time, a hysteresis parameter, and an event-based trigger.

2. The apparatus according to claim 1, wherein the apparatus is configured to activate the candidate secondary cell without reporting measurement results to the primary cell.

3. The apparatus according to claim 2, wherein the apparatus is configured to receive the candidate secondary cell configuration in connection with transitioning from an inactive mode or an idle mode to a connected mode.

4. The apparatus according to claim 3, wherein the apparatus is configured to receive the candidate secondary cell configuration in a broadcast transmission from the primary cell.

5. The apparatus according to claim 4, wherein the candidate secondary cell configuration is associated with a validity time, after which the candidate secondary cell configuration is no longer valid.

6. A method, comprising:
   receiving, in an apparatus, from a primary cell, a candidate secondary cell configuration which comprises conditions, wherein the candidate secondary cell configuration comprises radio resource configuration information of the candidate secondary cell;
   determining that the conditions are fulfilled, and
   activating, as a response to the determining, the candidate secondary cell into a carrier aggregation or a dual connectivity session of the apparatus, initiating a channel quality indication procedure, a measurement report, and a medium access control element to the primary cell to inform the primary cell of the activating of the candidate secondary cell, wherein the conditions comprise: a received reference signal power of the candidate secondary cell being higher than a threshold for at least a preconfigured time, a hysteresis parameter, and an event-based trigger.

7. The method according to claim 6, wherein the candidate secondary cell is activated without reporting measurement results to the primary cell.

8. The method according to claim 7, wherein the candidate secondary cell configuration is received in connection with transitioning from an inactive mode or an idle mode to a connected mode.

9. The method according to claim 8, wherein the candidate secondary cell configuration is received in a broadcast transmission from the primary cell.

10. The method according to claim 9, wherein the candidate secondary cell configuration is associated with a validity time, after which the candidate secondary cell configuration is no longer valid.

11. An apparatus, comprising:

at least one processing core;

at least one memory including computer program code, the at least one memory and the computer program code being configured to, with the at least one processing core, cause the apparatus at least to:

provide, to a user equipment, from a primary cell, for a carrier aggregation or dual connectivity session, a candidate secondary cell configuration which comprises conditions, wherein the candidate secondary cell configuration comprises radio resource configuration information of the candidate secondary cell, and signal to the candidate secondary cell to reserve, for the user equipment, resources in the candidate secondary cell which correspond to the candidate secondary cell configuration, wherein the conditions comprise: a received reference signal power of the candidate secondary cell being higher than a threshold for at least a preconfigured time, a hysteresis parameter, and an event-based trigger.

* * * * *